United States Patent [19]

Schmitt et al.

[11] 3,916,006
[45] Oct. 28, 1975

[54] PROCESS FOR THE CONTINUOUS PRODUCTION OF -ISOCYANATO-3-(ISOCYANATOMETHYL)-3,5,5-TRIMETHYLCYCLOHEXANE

[75] Inventors: Karl Schmitt; Josef Disteldorf, both of Herne; Johannes Reiffer, Essen-Heisingen, all of Germany

[73] Assignee: Veba Chemie AG, Gelsenkirchen-Buer, Germany

[22] Filed: May 8, 1974

[21] Appl. No.: 467,976

[30] Foreign Application Priority Data
May 9, 1973  Germany............................ 2323299

[52] U.S. Cl........................ 260/453 PH; 260/453 A
[51] Int. Cl.².................................. C07C 118/02
[58] Field of Search................................... 260/PH

[56] References Cited
UNITED STATES PATENTS
2,908,704   10/1959   Skiles................................. 260/453

Primary Examiner—Lewis Gotts
Assistant Examiner—Dolph H. Torrence
Attorney, Agent, or Firm—Burgess, Dinklage & Sprung

[57] ABSTRACT

Process for the continuous production of 1-isocyanato-3-(isocyanatomethyl)-3,5,5-trimethylcyclohexane by phosgenation of 1-amino-(3-aminomethyl)-3,5,5-trimethylcyclohexane derivatives having the formula

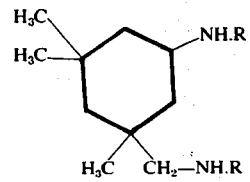

wherein R is —H·HCl or —COCl, which comprises decomposing a suspension of one of said derivatives in an inert solvent with excess phosgene at a temperature of 90° to 180°C, in already formed 1-isocyanato-3-(isocyanatomethyl)-3,5,5-trimethylcyclohexane and thereafter, if necessary, after a prereaction with phosgene, working up the reaction mixture after degasification.

2 Claims, 1 Drawing Figure

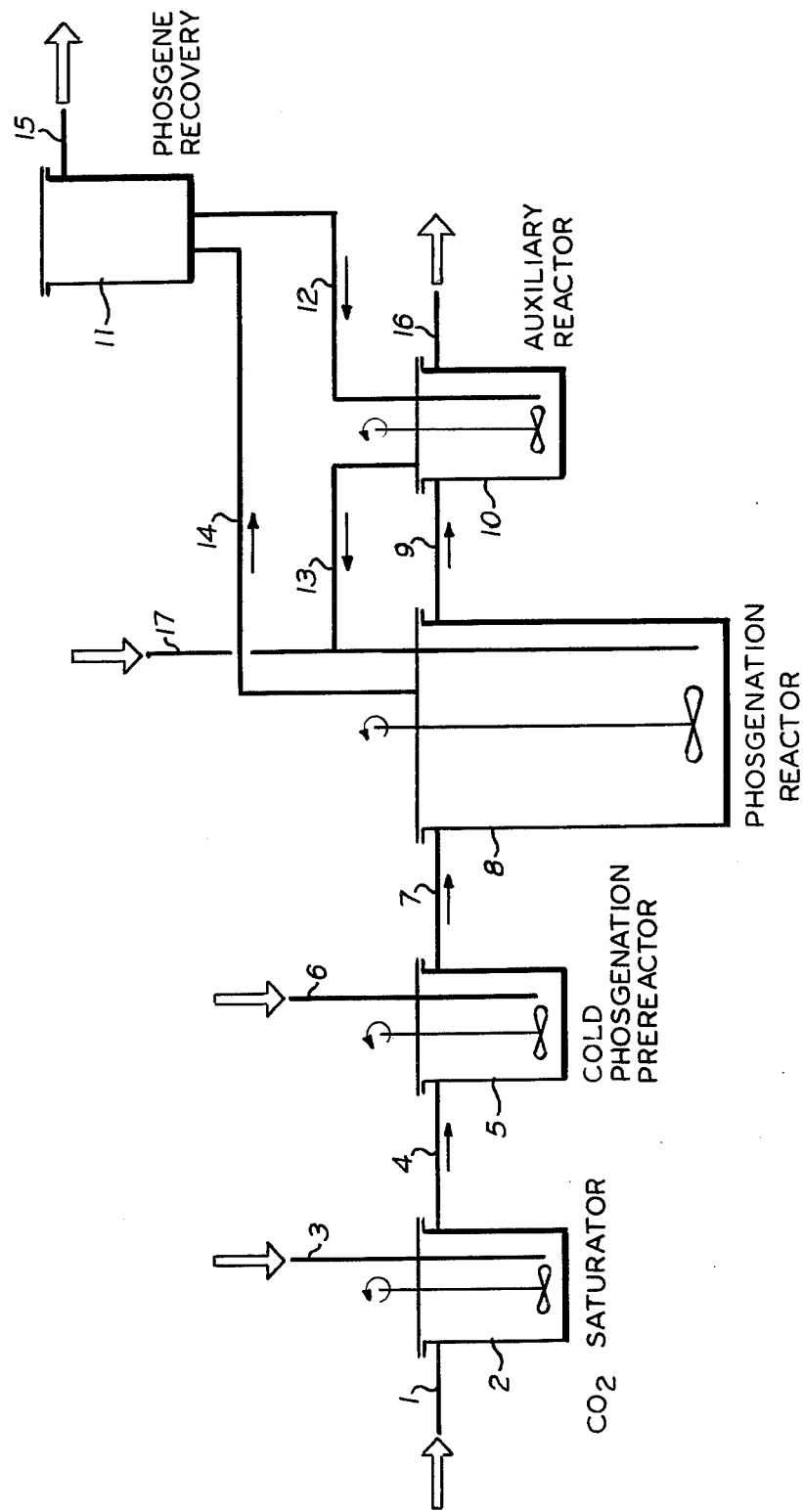

PROCESS FOR THE CONTINUOUS PRODUCTION OF -ISOCYANATO-3-(ISOCYANATOMETHYL)-3,5,5-TRIMETHYLCYCLOHEXANE

BACKGROUND

This invention relates to a process for the continuous production of 1-isocyanato-3-(isocyanatomethyl)-3,5,5-trimethylcyclohexane.

German Pat. No. 1 202 785 describes a process for the batch production of 1-isocyanato-3-(isocyanatomethyl)-3,5,5-trimethylcyclohexane (also called isophorone diisocyanate or IPDI) from 1-amino-3-(aminomethyl)-3,5,5-trimethylcyclohexane (also called isophorone diamine or IPD) by phosgenation.

Phosgenation of cycloaliphatic diamines can be carried out according to three basic methods, the base-, carbamate- or hydrochloride-method.

Base-phosgenation is executed in two stages. Firstly, the diamine is converted with exceeding phosgene in the cold (about 0°C), whereby a mixture of carbamide acid chloride and hydrochloride is formed. (The same reaction product is formed by loss of $CO_2$, if we derive from the carbamate of the diamine). In the second reaction stage, at a temperature of 80°C, the desired isocyanate is then formed from the carbamyl chloride under splitting off HCl, while the aminohydrochloride-group is converted by hot phosgenation to the isocyanate.

The phosgenation of a cycloaliphatic diamine according to the carbamate method can be carried out for example as follows:

A solution of the diamine, e.g. in o-dichlorobenzene, is saturated first with $CO_2$. Then the formed suspension runs under intense stirring at 0°C in a given phosgene solution. The reaction mixture is heated to a temperature of 160°C and is then treated at this temperature with phosgene as long as a clear solution is on hand. This can last about ten hours.

If a deviation from the above described hydrochloride method using the diamine dihydrochloride is attempted, only the hot phosgenation can be applied, because the stable salt practically does not react in the cold with phosgene.

Phosgenation is generally carried out in inert organic solvents, like aromatics, chloraromatics and hydroaromatics. Carbamates, carbamyl chloride and hydrochloride of the non-aromatic diamines are practically insoluble in these solvents, so that they come to a reaction in suspended form.

Common to all prior art processes described above is final hot phosgenation as the main reaction.

Of course, such a process can also be carried out continuously while the reaction mixture is passing a number of stirring vessels connected in series, also called stirring cascade. For long-term reactions, like hot phosgenation, the use of a multi-stage stirring cascade is required in order to improve the duration spectrum, otherwise the charge, where a completely reacted product is received, will be minimized.

A common characteristic of the phosgenation process is the use of a highly fluid suspension as the reaction mixture.

The phosgenation of IPD according to the prior art is very much complicated by a unique characteristic not recognized until now. At the beginning of the hot phosgenation, the suspended starting materials of the reaction phase (carbamyl chloride-hydrochloride and dihydrochloride) form a sticky mass, which settles in lumps at the reactor wall or at the stirrer. This creates a mechanical problem, namely imbalances at the agitator or lines can be clogged.

It is an object of the present invention to develop a process for the continuous production of IPDI, which has not only the advantages of a continuous process but also the possibility of working in a simple apparatus without clogging.

SUMMARY

Surprisingly, it was now found that the above described disadvantages of known methods in the process for the continuous production of 1 isocyanato-3-(isocyanatomethyl)-3,5,5-trimethylcyclohexane by phosgenation at increased temperature of 1 amino-(3-aminomethyl)-3,5,5-trimethylcyclohexane derivatives having the formula

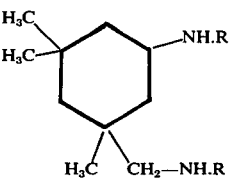

wherein R is —H.HCl or —COCl, can be avoided, if decomposition of the suspension of one of the derivatives in an inert solvent with excess phosgene is carried out at a temperature of 90° to 180°C, preferably 130° to 160°C, in already formed 1-isocyanato-3-(isocyanatomethyl)-3,5,5-trimethylcyclohexane and afterwards, if necessary after prereaction with phosgene the reaction mixture is worked up after degasification according to known methods.

DESCRIPTION OF THE DRAWING

The present invention will be more fully understood from the following description taken in conjunction with the accompanying drawing which is a schematic flow diagram of one embodiment for carrying out the process of the invention.

DESCRIPTION

By the method of the invention it is possible to do away with a multi-stage stirring cascade. A main reactor and a considerably smaller subsidiary or auxilliary reactor are completely sufficient for the execution of the conversion with high outputs. It is also surprising, that in spite of the reaction duration distribution, nearly completely reacted product can be withdrawed from the stirring stage, namely at a middle duration, which is less than the reaction time of the batch process, e.g., a throughput is achieved, which corresponds to a better space-time output than that in the batch process. Even at such protected conditions, like a reaction temperature of 130°C, the middle duration is less than 6 hours. In a batch reaction, because of clogging, reaction times up to 24 hours are necessary at a higher reaction temperature of 160°C, as is known from the examples of German Patent 1 202 785. Also, an extremely purer product will be achieved by the invention process under gentle conditions with output increased considerably.

For the execution of this process the following measures and instructions can be taken, which are shown in the drawing which is a flow diagram of the carbamate method.

In line 1 an IPD solution (for example IPD in chlorobenzene) is continuously supplied to the saturator 2 under intense stirring. Simultaneously from line 3 $CO_2$ is added to saturator 2 in excess at a temperature of 0 to 70°C, preferably 20° to 30°C. The carbamate suspension formed flows in line 4 to cold phosgenation prereactor 5, where it is contacted with excess phosgene from line 6 at −10 to +40°C, preferably 20° to 30°C, also with good stirring. The reaction mixture (suspended carbamyl chloride-hydrochloride-mixture) is fed via line 7 to main reactor 8 where it is subjected to hot phosgenation with fresh and recycled excess phosgene from line 13 and 17 at a temperature of 90° to 180°C, preferably 130° to 160°C.

After a certain time which depends on the size of the reactor 8 and the feed rate in line 1, the product is fed via line 9 to auxilliary reactor 10 which is run under the same conditions as reactor 8. However, the temperature can be somewhat higher than in reactor 8.

The reaction is completed in reactor 10. Recycled phosgene is fed via line 12 from recovery vessel 11 to reactor 10 and from there via 13 to reactor 8 in counter-current to the product stream in line 9. Excess phosgene from reactor 8 is fed via line 14 to the recovery vessel 11.

Hydrogenchloride and carbon dioxide formed are removed via line 15 from recovery vessel 11. Overflow product is removed via line 16 and supplied to a conventional fractional distillation step for purification and recovery.

In carrying out the invention using the hydrochloride method, the prereactor 5 is not necessary. Hydrochloride formation takes place in saturator 2 at temperatures up to 90°C. The hydrochloride suspension flows directly to the main reactor 8. Fresh phosgene is added via line 17 to the main reactor 8 and/or recycled phosgene is used via line 12 through subsidiary reactor 10 and line 13 to the main reactor 8. In other respects, the hot phosgenation corresponds to the carbamate method.

In carrying out the invention using the base method, however, the saturator 2 is not necessary and cold phosgenation is performed with higher phosgene excesses in prereactor 5. Also, a branch current of recycled phosgene from vessel 11 must be added together with fresh phosgene in prereactor 5. In other respects, the hot phosgenation proceeds as the carbamate method.

The invention will be described in greater detail in the following illustrated examples without, however, intending in any way to restrict the scope thereof.

EXAMPLE 1

CARBAMATE METHOD

In an apparatus as shown in the drawing, 200 grams IPD, dissolved in 1.5 l chlorobenzene and 55 grams $CO_2$-gas were hourly conducted to the saturator 2 with a volume 0.5 l at 20° to 30°C. The overflow ran into the reactor 5 having a content of 1.5 l in which at 30°C 240 grams phosgene were added. Then the suspension is fed via line 7 to main reactor 8 with 8 l reaction volume and a reactor temperature of 130°C. For starting the reaction, reactor 8 was filled with already formed IPDI through subsidiary reactor 10 of 1.5 l content also at a temperature of 130°C. Through the subsidiary reactor 10 and the main reactor 8, a phosgene stream of 150 g/h was added successively against the product stream via lines 12 and 13. A clean, nearly water-clear solution resulted in line 16. For safety, the solution was degassed before the fractional distillation. After the distillation of the IPDI solution in a 50 cm pack column, 256 g IPDI were recovered hourly. This corresponded to a output of 98% of theory based on the IPD fed to the system. The chlorine compound content of the raw product was at 0.1 weight percent and non distillative residues were under 2 weight percent.

EXAMPLE 2

HYDROCHLORIDE METHOD

The apparatus shown in the drawing is used without prereactor 5.

In saturator 2 of 0.5 l capacity 170 grams IPD, dissolved in 1.5 l o-dichlorobenzene were converted hourly with 80 grams HCl at 60°C under intense stirring. The mixture was fed via line 7 directly to the main reactor 8 with a capacity of 8 l and then to auxilliary reactor 10 having a capacity of 1.5 l. Both reactors 8 and 10 are at a reaction temperature of 160°C. In counterflow to the product stream a phosgene stream of 250 grams per hour was added via lines 12 and 13 successively through reactors 10 and 8.

Distillation was carried out as described in Example 1.

213 g IPDI were recovered hourly which corresponded to an output of 96% of the theory based on IPD. The raw product contained 0.3 weight percent chlorine compounds and less than 4 weight percent non-distillative residues.

EXAMPLE 3

BASE METHOD

The apparatus shown in the drawing is used without saturator 2.

In prereactor 5 of 1.5 l content 200 grams IPD, dissolved in 1,5 l chlorobenzene, and 469 grams phosgene were hourly brought continuously to reaction with cooling at about 10°C. Afterwards, the suspension is fed via line 7 to the main reactor 8 with a capacity of 8 l and subsidiary reactor 10 with a capacity of 1.5 l volume, both at a reaction temperature of 130°C. Through subsidiary and main reactors 10 and 8, 150 grams phosgene were added via lines 12 and 13 per hour counterflow to the product stream. The reaction product contained 249 grams IPDI hourly corresponding an output of about 95.5% of the theory based on the IPD fed into the system.

The raw product contained 0.2 weight percent chlorine compounds and about 4 weight percent non-distillative residues.

It is preferred that the volumes of suspension added hourly to the main reactor 8 are in the range of about one-eighth to one-fourth of the reactor volume. The actual quantities added depend on the reaction temperature and the content of solids of the suspension.

What is claimed is:

1. Process for the continuous production of 1-isocyanato-3-(isocyanatomethyl)-3,5,5-trimethylcyclohexane by phosgenation of 1-amino-(3- aminomethyl)-3,5,5-trimethylcyclohexane derivatives having the formula

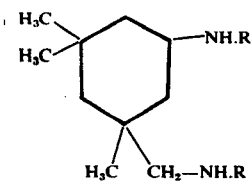

wherein R is —H.HCl or —COCl, which comprises decomposing in a reactor a suspension of one of said derivatives in an inert solvent with excess phosgene at a temperature of 90° to 180°C, in already formed 1-isocyanato-3-(isocyanatomethyl)-3,5,5-trimethylcyclohexane, the volume of suspension introduced hourly to the reactor being one-eight to one-fourth of the reactor volume, and thereafter, if necessary, after a pre-reaction with phosgene, working up the reaction mixture after degasification.

2. Process of claim 1 wherein the reaction with excess phosgene is carried out with stirring.

* * * * *